(12) United States Patent
Wu

(10) Patent No.: US 9,994,418 B2
(45) Date of Patent: Jun. 12, 2018

(54) 3D PRINTING FILAMENT FEEDING APPARATUS

(71) Applicants: XYZPRINTING, INC., New Taipei (TW); KINPO ELECTRONICS, INC., New Taipei (TW)

(72) Inventor: Chi-Chieh Wu, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 160 days.

(21) Appl. No.: 15/256,553

(22) Filed: Sep. 3, 2016

(65) Prior Publication Data

US 2017/0313541 A1    Nov. 2, 2017

(30) Foreign Application Priority Data

Apr. 29, 2016    (CN) .......................... 2016 1 0283331

(51) Int. Cl.
| | |
|---|---|
| *B65H 51/04* | (2006.01) |
| *B33Y 30/00* | (2015.01) |
| *B29C 67/00* | (2017.01) |
| *B29C 64/35* | (2017.01) |
| *B29C 64/321* | (2017.01) |
| *B29C 64/118* | (2017.01) |

(52) U.S. Cl.
CPC ............ *B65H 51/04* (2013.01); *B29C 64/118* (2017.08); *B29C 64/321* (2017.08); *B29C 64/35* (2017.08); *B29C 67/0055* (2013.01); *B29C 67/0085* (2013.01); *B29C 67/0096* (2013.01); *B33Y 30/00* (2014.12)

(58) Field of Classification Search
CPC ......... B33Y 30/00; B33Y 10/00; B33Y 50/02; B33Y 40/00; B33Y 50/00; B33Y 80/00; B33Y 99/00; B29C 64/20; B29C 64/106; B29C 64/386; B29C 67/0085; B29C 67/0088; B29C 64/112; B65H 51/04
See application file for complete search history.

(56) References Cited

U.S. PATENT DOCUMENTS

| | | | |
|---|---|---|---|
| 2016/0279853 A1* | 9/2016 | Bracha ................ | B29C 47/1018 |
| 2016/0339634 A1* | 11/2016 | Fuller ................. | B29C 67/0055 |
| 2017/0096315 A1* | 4/2017 | Jackson ................ | B65H 49/00 |

(Continued)

*Primary Examiner* — Yaritza Guadalupe-McCall
(74) *Attorney, Agent, or Firm* — Chun-Ming Shih; HDLS IPR Services

(57) ABSTRACT

A 3D printing filament feeding apparatus for feeding a filament (10) includes a primary driving wheel (100), a secondary driven wheel (300), a measurement scale rotating disk (400), an optical sensor (500) and a cleaning assembly (600). The primary driving wheel (100) is connected to a power source (200) and driven thereby to rotate. The secondary driven wheel (300) is arranged adjacent to and parallel with the primary driving wheel (100). The measurement scale rotating disk (400) includes scale structures (410) and rotates together with the secondary driven wheel (300). The optical sensor (500) detects the scale structures (410). The cleaning assembly (600) engages with the scale structures (410); wherein the secondary driven wheel (300) engages with the filament (10) and rotates along a driven direction (D) together therewith such that the scale structures (410) passes through the cleaning assembly (600), followed by detection of the optical sensor (500).

9 Claims, 7 Drawing Sheets

(56) References Cited

U.S. PATENT DOCUMENTS

2017/0106565 A1* 4/2017 Braley ................. B29B 13/022
2017/0157826 A1* 6/2017 Hishiki ............... B29C 47/0014
2017/0253681 A1* 9/2017 Shen .................... C08F 220/18
2017/0326773 A1* 11/2017 Gibson .................. B29C 47/04

* cited by examiner

3D PRINTING FILAMENT FEEDING APPARATUS

BACKGROUND OF THE INVENTION

Field of the Invention

The present invention is related to 3D printing technology, in particular, to a 3D printing filament feeding apparatus with a cleaning assembly.

Description of Related Art

One of the types of the currently existing 3D printing devices is to deliver the filaments into a moveable nozzle for melting therein, and the nozzle moves while squeezing the molten material out at the same in order to allow the molten material to deposit in formation. Such type of 3D printing device comprises a feeding mechanism for delivering the filaments into the nozzle. A typical feeding mechanism comprises a primary driving wheel and a motor, in which the motor drives the primary driving wheel to rotate, and the primary driving wheel abutted against the side surface of the filament in order to feed and push the feeding filament forward. The motor is installed with a built-in encoder for providing the rotational angle of the motor in order to calculate the length of the feeding filament based on such angle.

The drawback of the aforementioned feeding mechanism is discovered to be that during the process of the feeding of the filament, once slippage occurs between the feeding filament and the primary driving wheel, there would be errors in the calculation of the feeding material length. A method of improvement to overcome such issue is to provide a secondary driven wheel. The secondary driven wheel engages with the feeding filament and is driven by the feeding filament to rotate. Since the secondary driven wheel is not driven by electric power, it is not likely to slip. As a result, by measuring the rotational angle of the secondary driven wheel, the length of the feeding filament can be obtained precisely.

The method of measuring the rotational angle of the secondary driven wheel requires the installation of a rotational optical scale moving together with the secondary driven wheel. The optical scale is of a circular disk shape, and the optical scale rotates through an optical sensor such that the optical sensor is able to read the scale divisions on the optical scale. Nevertheless, the rotating axles of the primary driving wheel, the secondary driven wheel and the optical scale etc. in the feeding mechanism are all applied with lubricant thereon, and the friction between the primary driving wheel and the secondary driven wheel in contact with the feeding filament would also generate debris; consequently, once the lubricant or debris is attached onto the optical scale, it would cause the optical sensor to be unable to read the scale divisions on the optical scale accurately which in turn, would cause calculation errors on the feeding material length.

In view of the above, the inventor of the present invention seeks to overcome the aforementioned problems associated with the currently existing techniques after years of research along with the utilization of the academic principles in order to provide an improved solution with objectives of overcoming the existing shortcomings.

SUMMARY OF THE INVENTION

The present invention provides a 3D printing filament feeding apparatus with a cleaning assembly.

The present invention provides a 3D printing filament feeding apparatus, used for feeding a filament, comprising a primary driving wheel, a secondary driven wheel, a measurement scale rotating disk, an optical sensor and a cleaning assembly. The primary driving wheel is connected to a power source and driven by the power source to rotate. The secondary driven wheel is arranged adjacent to and parallel with the primary driving wheel. The measurement scale rotating disk includes a plurality of scale structures formed thereon, and the measurement scale rotating disk moves and rotates together with the secondary driven wheel. The optical sensor is configured to detect the plurality of scale structures of the measurement scale rotating disk. The cleaning assembly is configured to engage with the plurality of scale structures on the measurement scale rotating disk; wherein the primary driving wheel engages with and feeds the filament, the secondary driven wheel engages with the filament and rotates along a driven direction in conjunction with a movement of the filament in order to allow each one of the scale structures on the measurement scale rotating disk to pass through the cleaning assembly engage therewith along the driven direction, followed by using the optical sensor for detection thereof.

The cleaning assembly can comprise a brush, and bristles of the brush are arranged parallel with the measurement scale rotating disk. The cleaning assembly can also comprise a pair of brushes engaged with two sides of the measurement disk rotating disk respectively, and bristles of each one of the brushes are arranged perpendicular to the measurement rotating disk. In addition, the pair of brushes is arranged alternatively along a circumferential direction of the measurement scale rotating disk.

The cleaning assembly can comprise a pair of foaming blocks engaged with two sides of the measurement scale rotating disk. Furthermore, the pair of foaming blocks is arranged alternatively along a circumferential direction of the measurement scale rotating disk.

The measurement scale rotating disk is opaque, and each one of the scale structures is light transmissive or opaque.

The plurality of scale structure are arranged adjacent to an edge of the measurement scale rotating disk, and the optical sensor shields the edge of the measurement scale rotating disk. The measurement rotating disk moves and rotates coaxially together with the secondary driven wheel.

DETAILED DESCRIPTION OF THE INVENTION

Figure 1:
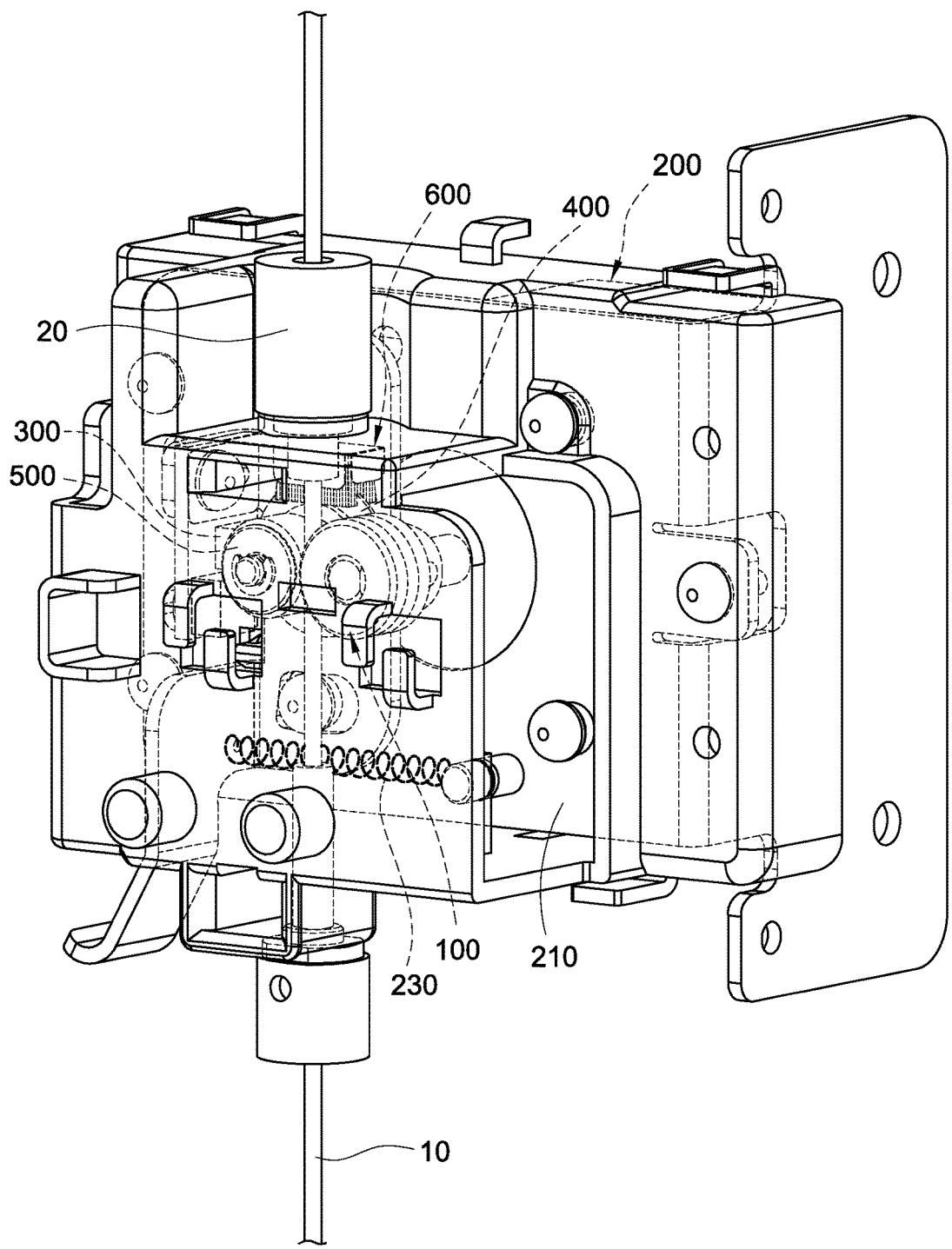
FIG. 1 is a perspective view of a 3D printing filament feeding apparatus according to a first embodiment of the present invention.
Figure 2:
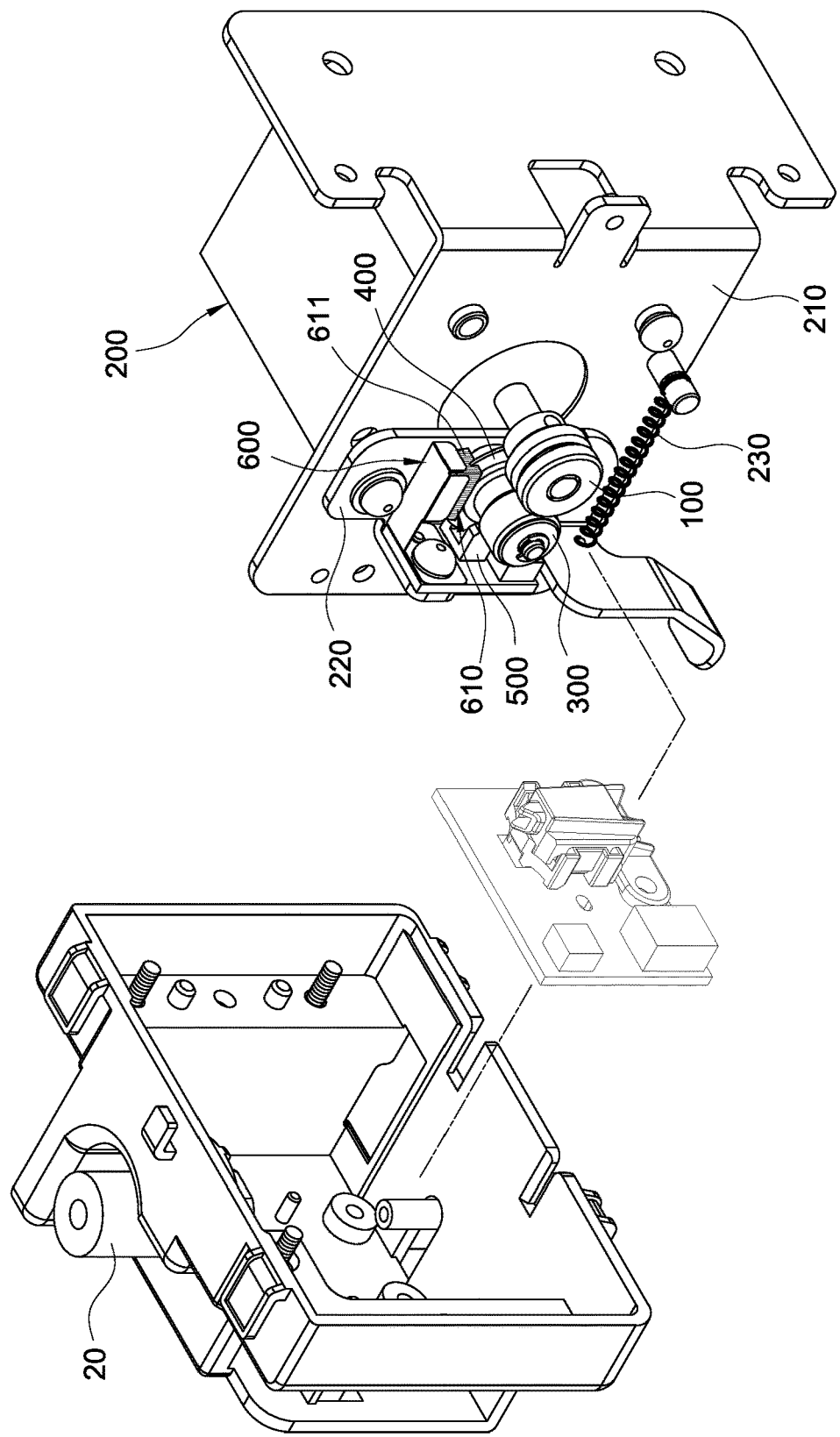
FIG. 2 is a perspective exploded view of the 3D printing filament feeding apparatus according to the first embodiment of the present invention.
Figure 3:
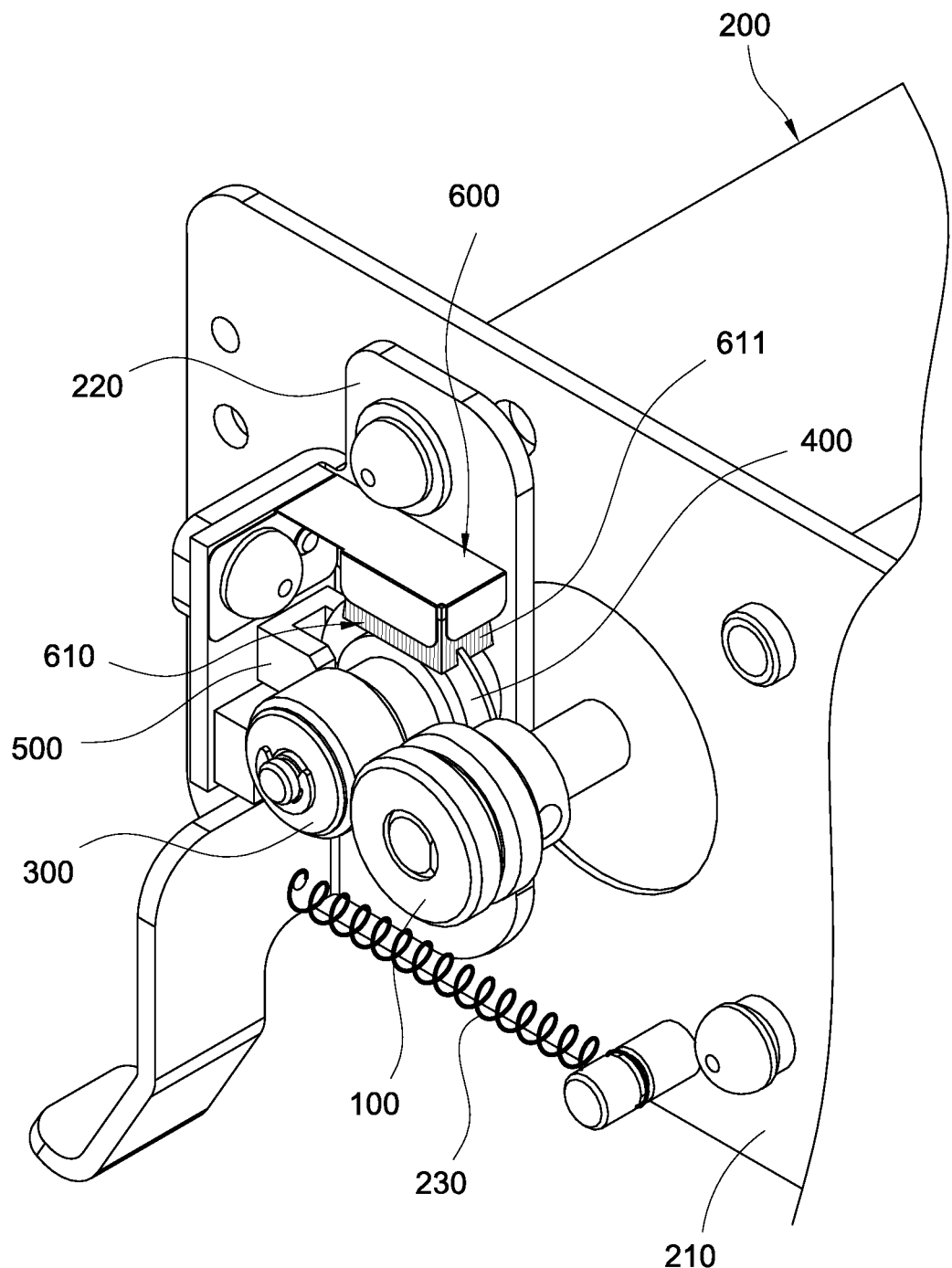
FIG. 3 is a partial view of the 3D printing filament feeding apparatus according to the first embodiment of the present invention.

As shown in FIG. 1 to FIG. 4, according to a first embodiment of the present invention, a 3D printing filament feeding apparatus, used for feeding a filament 10, comprising a feeding tube 20, a primary driving wheel 100, a power source 200, a secondary driven wheel 300, a measurement scale rotating disk 400 and a cleaning assembly 600.

The primary driving wheel 100 and the power source 200 (such as a motor) are arranged on a securement base 210 together, and the primary driving wheel 100 is connected to the power source 200 in order to be driven by the power source 200 to rotate. The primary driving wheel 100 is used for engaging with the filament 10 in order to feed the filament 10. The secondary driven wheel 300 is used for engaging with the filament 10 and to rotate in conjunction with a movement of the filament 10. In this embodiment, the securement base 210 can be moveably arranged with a moving base 220, and an elastic unit 230 can be connected between the securement base 210 and the moving base 220. The secondary driven wheel 300 is arranged on the moving base 220 in order to be adjacent to and parallel with the primary driving wheel. In addition, the elastic unit 230 pulls the moving base 220 such that the secondary driven wheel 300 is pulled toward the primary driving wheel 100. A feeding zone A allowing the filament to pass through is formed between the secondary driven wheel 300 and the primary driving wheel 100. When the filament 10 passes through the feeding zone A, it is clamped between the primary driving wheel 100 and the secondary driven wheel 300; however, the present invention is not limited to such configuration only. The feeding tube 20 is arranged along the direction of one of the tangent lines on the rotational direction of the primary driving wheel 100 such that when the primary driving wheel 100 rotates, it is able to push the filament 10 into the feeding tube 20.

In this embodiment, the measurement scale rotating disk 400 is arranged coaxially with the secondary driven wheel 300 in order to move and rotate together therewith; however, the present invention is not limited to such coaxial movement and rotation only. The measurement scale rotating disk 400 includes a plurality of scale structures 410 formed thereon; wherein the measurement scale rotating disk 400 can be light transmissive plastic circular disk, and each one of the scale structures 410 can be an opaque layer printed on the measurement scale rotating disk 400. The measurement scale rotating disk 400 can also be opaque circular disk, and each one of the scale structures 410 can be perforations formed to penetrating the measurement scale rotating disk 400. In addition, the scale structures 410 can be light reflective scale structures 410 such that by making a portion of the area thereof to be light reflective while another portion of the area thereof to be non-reflective, the scales can be defined. In this embodiment, the plurality of scale structures 410 are arranged adjacent to the edge of the measurement scale rotating disk 400. During the processing feeding the filament 10, the measurement scale rotating disk 400 rotates in order to allow each one of the scale structures 410 to move along a driven direction D such that it is able to move back and forth relative to the filament 10; however, the present invention is not limited to such configuration only.

The internal of the optical sensor 500 is able to generate a light source, and the optical sensor 500 is arranged corresponding to the edge of the measurement scale rotating disk 400 while being able to shield the measurement scale rotating disk 400 in order to allow the plurality of scale structures 410 to pass through the optical sensor 500 during the rotation of the measurement scale rotating disk 400. The optical sensor 500 is configured to detect the plurality of scale structures 410 on the measurement scale rotating disk 400 such that when the scale structures 410 pass through the optical sensor 500, the optical sensor 500 is able to determine and read the scale structures 410 based on whether the light source is shielded or not.

The cleaning assembly 600 is configured to engage with the plurality of scale structures 410 on the measurement scale rotating disk 400. The cleaning assembly 600 clamps onto the two sides of the measurement scale rotating disk 400. When each scale structure 410 passes through the feeding tube 20, it then subsequently passes through the cleaning assembly 600, followed by passing through the detection of the optical sensor 500. In this embodiment, the cleaning assembly 600 comprises a brush 610, and the bristles 611 of the brush 610 are arranged parallel with the measurement scale rotating disk 400. The side surfaces of the brushes 611 contact with the measurement scale rotating disk 400.

Figure 4:
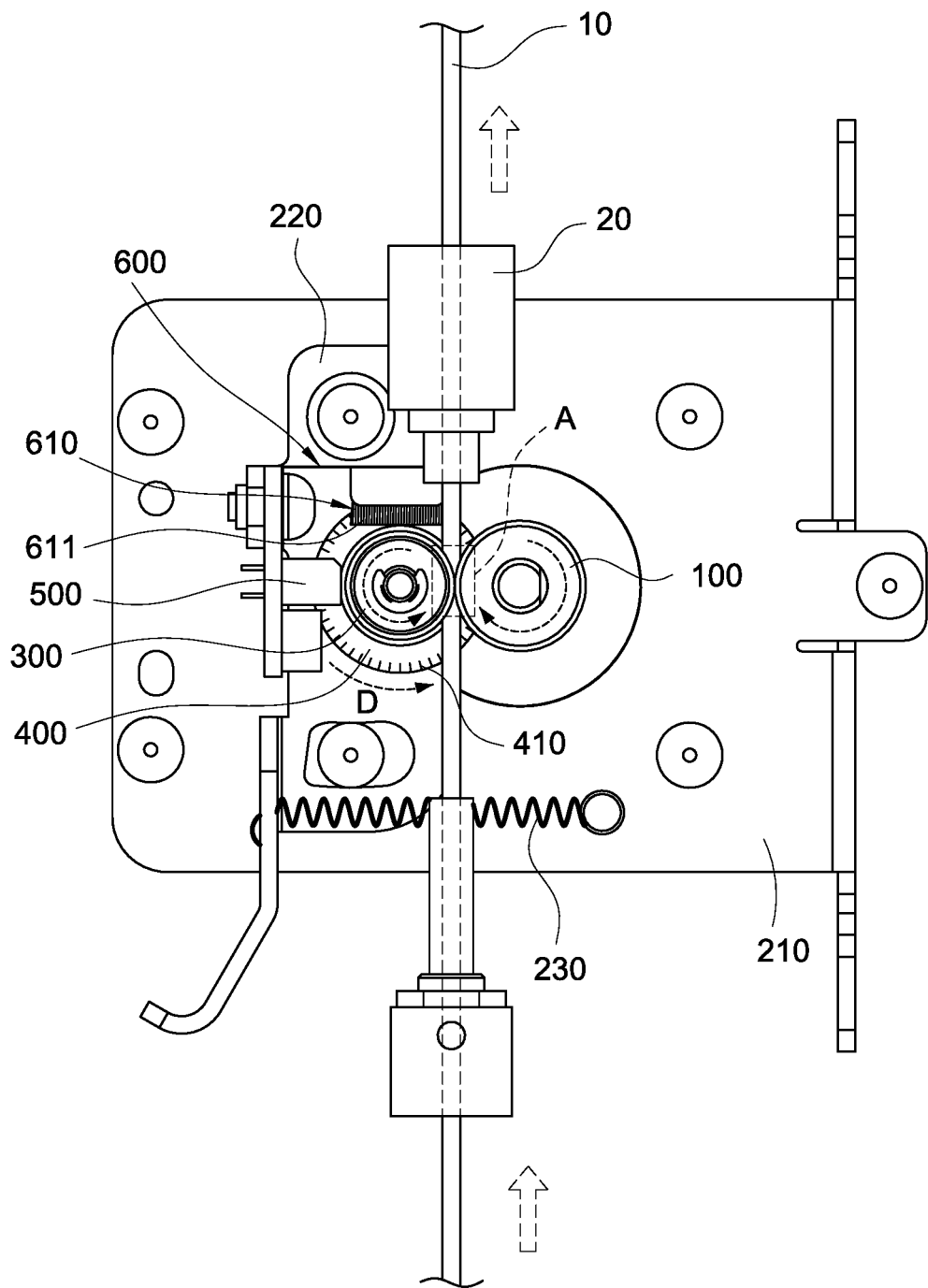
FIG. 4 is an illustration showing a working state view of the 3D printing filament feeding apparatus according to the first embodiment of the present invention.

As shown in FIG. 4, during the feeding of the filament 10 by the 3D printing filament feeding apparatus of the present invention, the primary driving wheel 100 engages with the filament 10 and is driven to rotate by the motor 200 in order to push and feed the filament 10. The filament 10 is clamped at the feeding zone A between the primary driving wheel 100 and the secondary driven wheel 300. The secondary driven wheel 300 engages with the filament 10 such that when the filament 10 is pushed and fed, the secondary driven wheel 300 moves along with the filament 10 in order to rotate. During the feeding process of the filament 10, the measurement scale rotating disk 400 and the secondary driven wheel 300 rotates in conjunction with each other in order to allow the optical sensor 500 to read each scale structure 410; therefore it is able to calculate the feeding length of the filament 10 based on the reading. After each one of the scale structures 410 moves to approach the feeding zone A along the driven direction D (i.e. the closest point between the edge and the feeding zone A), but prior to entering into the optical sensor 500 area, the scale structures 410 pass through the cleaning assembly 600 first in order to allow the cleaning assembly 600 to wipe the scale structures 410 such that any dirt and containment on the scale structures 410 can be removed; therefore, it is able to ensure precise reading of the optical sensor 500 on measuring the feeding length of the filament 10.

Figure 5:
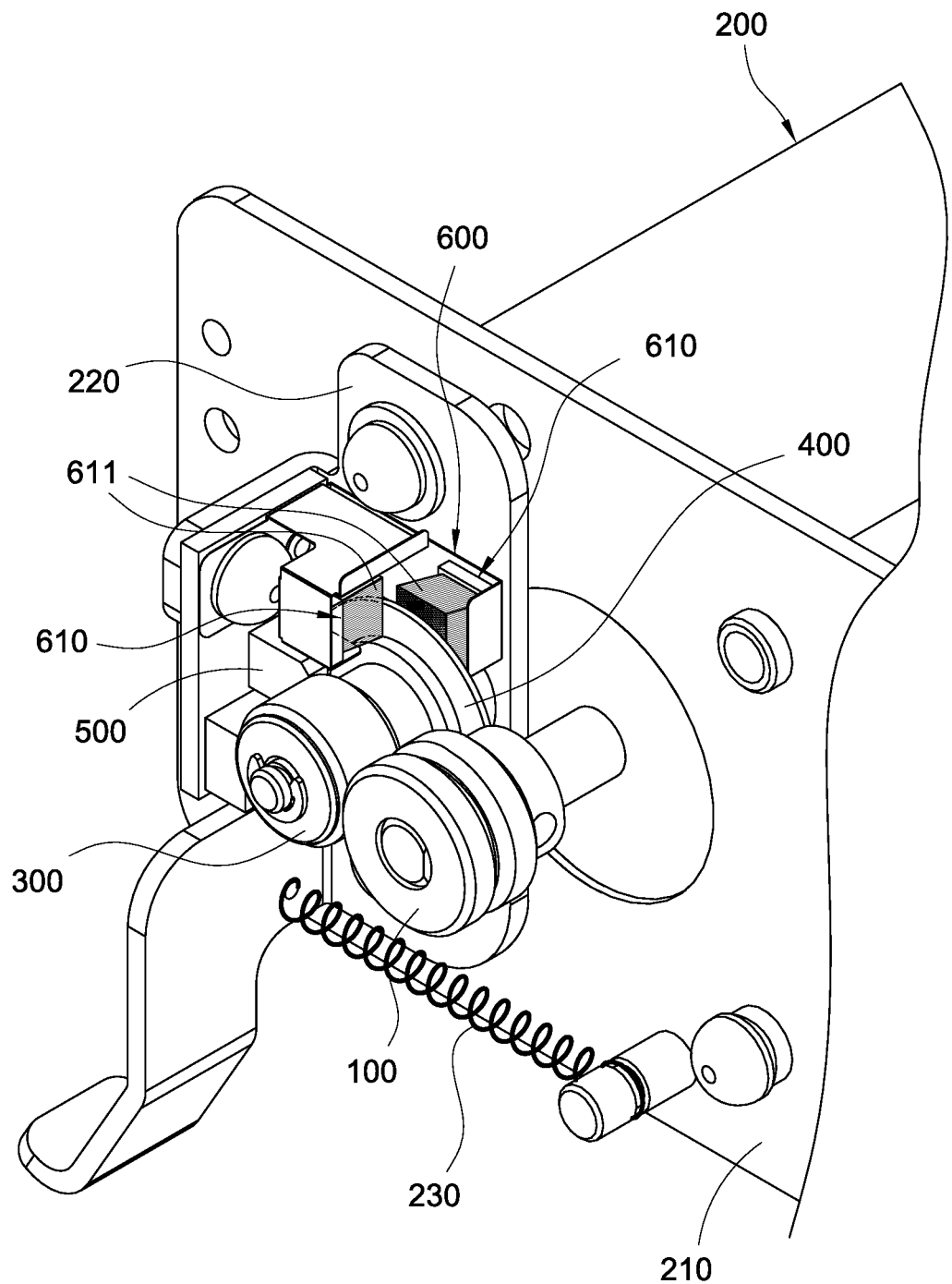
FIG. 5 is a perspective view of a 3D printing filament feeding apparatus according to a second embodiment of the present invention.
Figure 6:
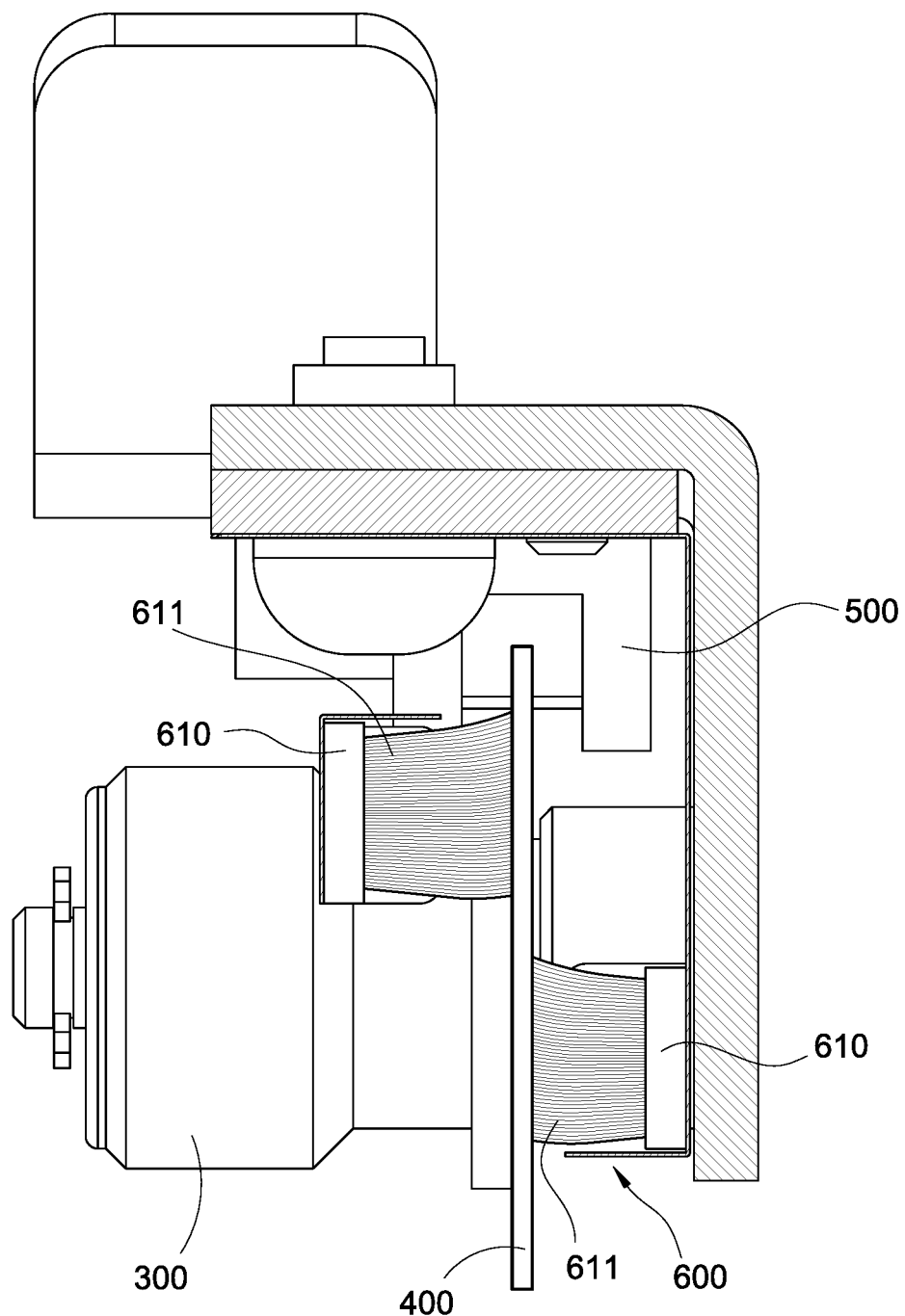
FIG. 6 is another view of the 3D printing filament feeding apparatus according to the second embodiment of the present invention.

As shown in FIG. 1, FIG. 5 and FIG. 6, according to a second embodiment of a 3D printing filament feeding apparatus of the present invention, used for feeding a filament 10 (as shown in FIG. 1), the apparatus comprises a primary driving wheel 100, a power source 200 (such as a motor), a secondary driven wheel 300, a measurement scale rotating disk 400 and a cleaning assembly 600. Wherein, the structures and relative relationships among the primary driving wheel 100, the power source 200, the secondary driven wheel 300 and the measurement scale rotating disk 400 are similar to those of the aforementioned first embodiment; therefore, relevant details are omitted hereafter.

Differences between the second embodiment and the first embodiment of the present invention are described in detail as follows. The cleaning assembly 600 clamps onto the two sides of the measurement scale rotating disk 400 in order to allow the two sides of the measurement scale rotating disk 400 to be exerted with even forces thereon without deflections in rotation. The cleaning assembly 600 comprises a pair of brushes 610 engaged with two sides of the measurement scale rotating disk 400 respectively, and the bristles 611 of each brush 610 are arranged perpendicular to the measurement scale rotating disk 400. Since the bristles 611 engaged with the measurement scale rotating disk 400 at the normal direction, they would generate a greater pressure on the measurement scale rotating disk 400 (a greater pressure in a sense of comparing with the first embodiment in which the bristles 611 use the side surface to contact with the measurement scale rotating disk 400). The pair of brushes 610 is arranged alternatively along a circumferential direction of the measurement scale rotating disk 400 in order to prevent an overly large clamping force exerted onto the measurement scale rotating disk 400, which may be unfavorable to the rotation thereof.

Figure 7:
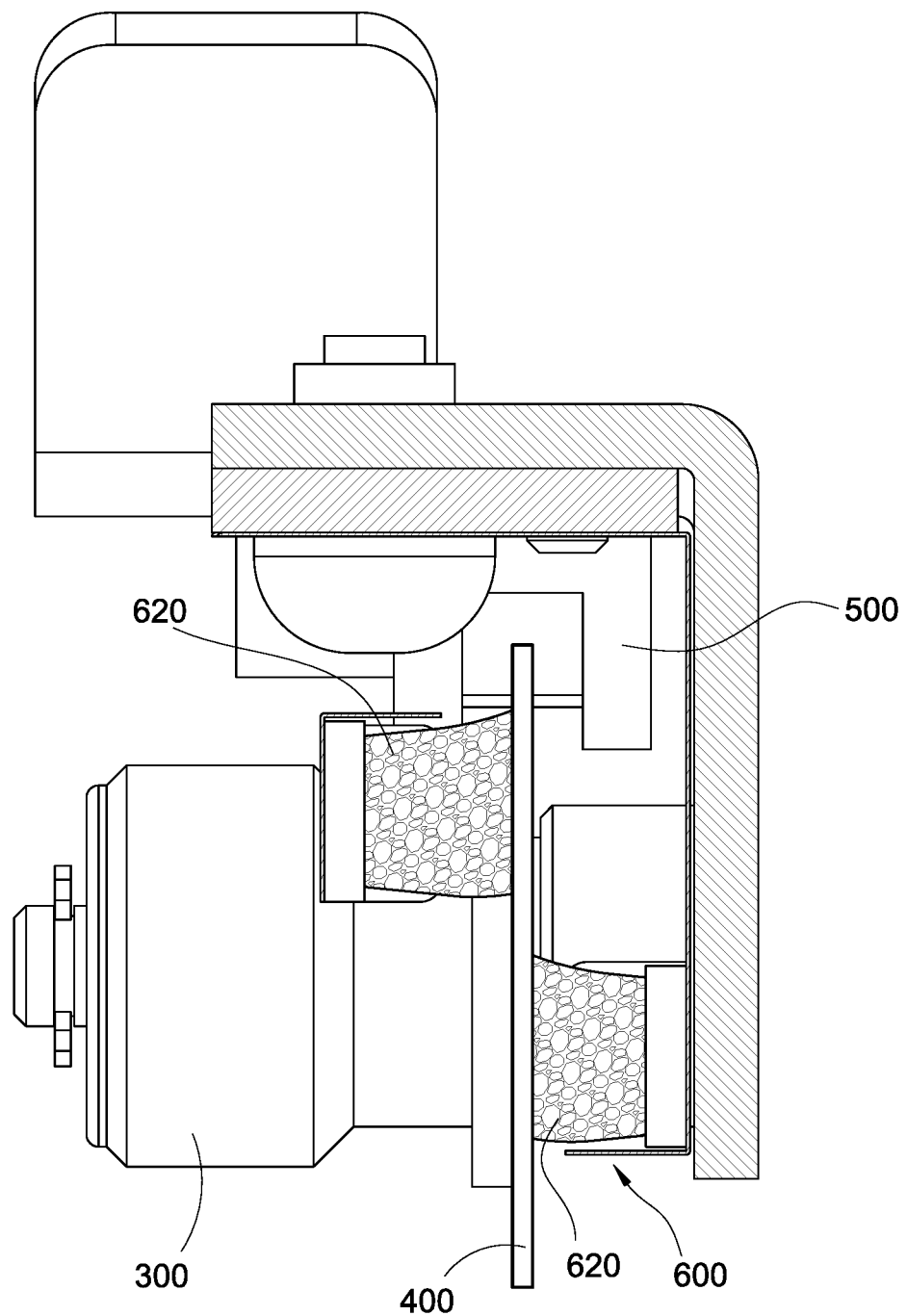
FIG. 7 is an illustration showing another configuration of the 3D printing filament feeding apparatus according to the second embodiment of the present invention.

The present invention is not limited to the cleaning assembly 600 that uses brush(es) 610 to clean off the scale structures 410 on the measurement scale rotating disk 400. For example, the cleaning assembly 600 can also be provided with a pair of foaming blocks 620 (such as foam blocks or sponge blocks) arranged to engage with the two sides of the measurement scale rotating disk 400 respectively, as shown in FIG. 7. In addition, the pair of foaming blocks 620 can also be arranged alternatively along the circumferential direction of the measurement scale rotating disk 400 in order to prevent overly large clamping forces exerted onto the rotating disk.

The preferred embodiments of the present invention described above are provided for illustration purposes only and shall not be treated as limitations of the scope of the present invention. Other equivalent variations utilizing the spirit of the patent of the present invention shall also be considered to be within the scope of the present invention.

What is claimed is:

1. A 3D printing filament feeding apparatus, used for feeding a filament (10), comprising:
   a primary driving wheel (100) connected to a power source (200) and driven by the power source (200) to rotate;
   a secondary driven wheel (300) arranged adjacent to and parallel with the primary driving wheel (100);
   a measurement scale rotating disk (400), the measurement scale rotating disk (400) having a plurality of scale structures (410) formed thereon, the measurement scale rotating disk (400) moving and rotating together with the secondary driven wheel (300);
   an optical sensor (500) configured to detect the plurality of scale structures (410) of the measurement scale rotating disk (400); and
   a cleaning assembly (600) configured to engage with the plurality of scale structures (410) on the measurement scale rotating disk (400); wherein the primary driving wheel (100) engages with and feeds the filament (10), the secondary driven wheel (400) engages with the filament (10) and rotates along a driven direction (D) in conjunction with a movement of the filament (10) in order to allow each one of the scale structures (410) on the measurement scale rotating disk (400) to pass through the cleaning assembly (600) engaged therewith along the driven direction (D), followed by using the optical sensor (500) for detection thereof.

2. The 3D printing filament feeding apparatus according to claim 1, wherein the cleaning assembly (600) comprises a brush (610), and bristles (611) of the brush (610) are arranged parallel with the measurement scale rotating disk (400).

3. The 3D printing filament feeding apparatus according to claim 1, wherein the cleaning assembly (600) comprises a pair of brushes (610) engaged with two sides of the measurement disk rotating disk (400) respectively, and bristles (611) of each one of the brushes (610) are arranged perpendicular to the measurement rotating disk (400).

4. The 3D printing filament feeding apparatus according to claim 3, wherein the pair of brushes (610) are arranged alternatively along a circumferential direction of the measurement scale rotating disk (400).

5. The 3D printing filament feeding apparatus according to claim 1, wherein the cleaning assembly (600) comprises a pair of foaming blocks (620) engaged with two sides of the measurement scale rotating disk (400).

6. The 3D printing filament feeding apparatus according to claim 5, wherein the pair of foaming blocks (620) are arranged alternatively along a circumferential direction of the measurement scale rotating disk (400).

7. The 3D printing filament feeding apparatus according to claim 1, wherein the measurement scale rotating disk (400) is opaque, and each one of the scale structures (410) is light transmissive or opaque.

8. The 3D printing filament feeding apparatus according to claim 1, wherein the plurality of scale structure (410) are arranged adjacent to an edge of the measurement scale rotating disk (400), and the optical sensor (500) shields the edge of the measurement scale rotating disk (400).

9. The 3D printing filament feeding apparatus according to claim 1, wherein the measurement rotating disk (400) moves and rotates coaxially together with the secondary driven wheel (300).

* * * * *